(12) United States Patent
Cheng

(10) Patent No.: US 11,983,321 B1
(45) Date of Patent: May 14, 2024

(54) HAND-FREE HAPTIC FEEDBACK SYSTEM AND METHOD

(71) Applicant: HTC Corporation, Taoyuan (TW)

(72) Inventor: Fang Yu Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/297,653

(22) Filed: Apr. 10, 2023

(51) Int. Cl.
G06F 3/01 (2006.01)
G06F 3/0346 (2013.01)
G06F 3/04815 (2022.01)

(52) U.S. Cl.
CPC .............. *G06F 3/014* (2013.01); *G06F 3/016* (2013.01); *G06F 3/0346* (2013.01); *G06F 3/04815* (2013.01)

(58) Field of Classification Search
CPC ........ G06F 3/014; G06F 3/016; G06F 3/0346; G06F 3/04815; G06F 3/017; A63F 13/285; A63F 2300/303
See application file for complete search history.

(56) References Cited

U.S. PATENT DOCUMENTS

| | | | | |
|---|---|---|---|---|
| 11,709,550 | B2* | 7/2023 | Yokoyama | G06F 3/011 715/702 |
| 2017/0212589 | A1* | 7/2017 | Domenikos | G06F 3/0346 |
| 2020/0142490 | A1 | 5/2020 | Xiong et al. | |
| 2020/0356162 | A1* | 11/2020 | Wang | G06F 3/011 |
| 2022/0236806 | A1 | 7/2022 | Carter et al. | |

FOREIGN PATENT DOCUMENTS

| | | |
|---|---|---|
| CN | 106843475 | 6/2017 |
| CN | 107636605 | 1/2018 |
| CN | 112119367 | 12/2020 |
| CN | 112585773 | 3/2021 |
| TW | 201837660 | 10/2018 |
| TW | 202141235 | 11/2021 |

OTHER PUBLICATIONS

"Office Action of Taiwan Counterpart Application", dated Dec. 4, 2023, p. 1-p. 8.

* cited by examiner

*Primary Examiner* — Kevin M Nguyen
(74) *Attorney, Agent, or Firm* — JCIPRNET

(57) ABSTRACT

A display device is configured to display a virtual world. A hand-mounted device is adapted to be worn on a hand of a user and includes an ultrasound transducer and a contact sensor. The ultrasound transducer is configured to emit an ultrasound haptic. The contact sensor is configured to detect a sensor value. A processor is configured to obtain a real position of the hand-mounted device to determine a virtual position of a virtual hand in the virtual world and to determine a virtual distance between the virtual hand and a virtual object in the virtual world based on the virtual position. The processor is configured to determine the hand of the user is open based on the sensor value and in response to the virtual distance being smaller than a contact distance and the hand being open, enable the ultrasound transducer to emit the ultrasound haptic to the finger.

19 Claims, 9 Drawing Sheets

HAND-FREE HAPTIC FEEDBACK SYSTEM AND METHOD

BACKGROUND

Technical Field

The disclosure relates to a hand-free haptic feedback system; particularly, the disclosure relates to a hand-free haptic feedback system and a hand-free haptic feedback method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a hand-free haptic feedback system and a hand-free haptic feedback method, so as to provide a haptic feedback to a user conveniently.

In this disclosure, a hand-free haptic feedback system is provided. The hand-free haptic feedback system includes a display device, a hand-mounted device, and a processor. The display device is configured to display a virtual world. The hand-mounted device is adapted to be worn on a hand of a user. The hand-mounted device includes an ultrasound transducer and a contact sensor. The ultrasound transducer is configured to emit an ultrasound haptic. The contact sensor is configured to detect a sensor value. The processor is configured to obtain a real position of the hand-mounted device to determine a virtual position of a virtual hand in the virtual world. The processor is configured to determine a virtual distance between the virtual hand and a virtual object in the virtual world based on the virtual position. The processor is configured to determine a hand of the user is open or not based on the sensor value. The processor is configured to, in response to the virtual distance being smaller than a contact distance and the hand being open, enable the ultrasound transducer to emit the ultrasound haptic to the finger of the user.

In this disclosure, a hand-free haptic feedback method is provided. The hand-free haptic feedback method includes: obtaining a real position of a hand-mounted device to determine a virtual position of a virtual hand in a virtual world, wherein the hand-mounted device is adapted to be worn on a hand of a user; determining a virtual distance between the virtual hand and a virtual object in the virtual world based on the virtual position; determining the hand of the user is open or not based on a sensor value detected by a contact sensor of the hand-mounted device; and in response to the virtual distance being smaller than a contact distance and the hand being open, enabling an ultrasound transducer of the hand-mounted device to emit an ultrasound haptic to the finger of the user.

Based on the above, according to the hand-free haptic feedback system and the hand-free haptic feedback method, the haptic feedback is provided to the user conveniently.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
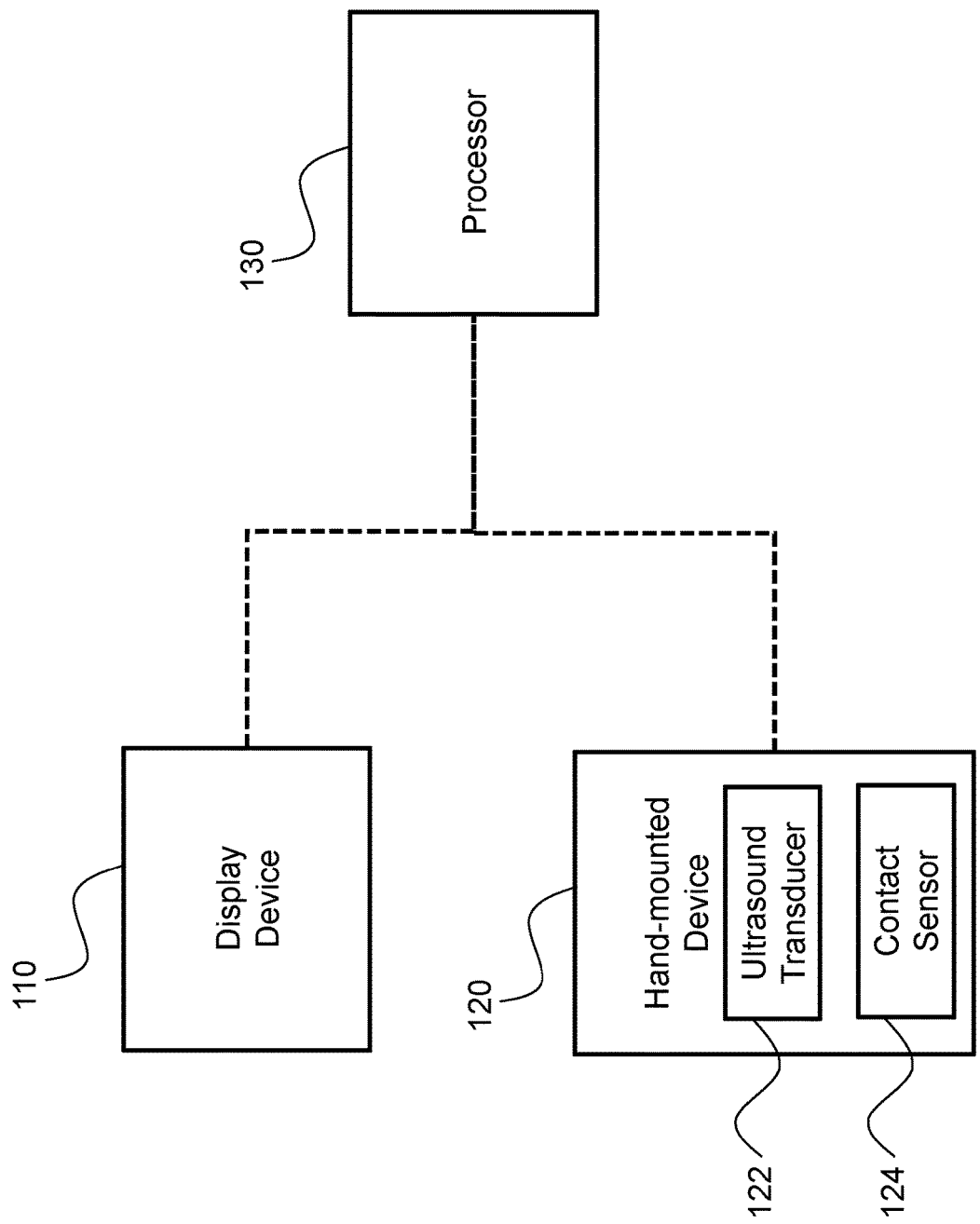
FIG. 1 is a schematic diagram of a hand-free haptic feedback system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

For the sense of touch, haptic feedback device such as vibration generator and ultrasound transducer may be utilized. However, if the vibration generator is embedded in a hand-held device, the user needs to grab the hand-held device all the time and thereby restricting the freedom of the user. Further, since the user is holding the hand-held device, the vibration generated by the vibration generator may be felt not only by the fingers of the user but also by the whole hand of the user. Furthermore, the vibration also brings some unnecessary noise to the user. Similarly, if an ultrasound transducer is used to provide the haptic feedback, a sensor (e.g., a camera) will be used to detect the status of the fingers. Since the sensor is fixed in a static device (e.g., tablet), the user needs to place the fingers in a field of view of the sensor, thereby restricting the freedom of the user. Hence, how to a haptic feedback to the user conveniently in the applications of AR, VR, or MR is becoming an issue to work on.

FIG. 1 is a schematic diagram of a hand-free haptic feedback system according to an embodiment of the disclosure. With reference to FIG. 1, a hand-free haptic feedback system 100 may include a display device 110, a hand-mounted device 120, and a processor 130. The display device 110 may be configured to display a virtual world for providing an immersive experience such as applications of AR, VR, or MR.

The hand-mounted device 120 may be adapted to be worn on a hand of a user. The hand-mounted device 120 may include an ultrasound transducer 122 and a contact sensor 124. Further, the ultrasound transducer 122 may be configured to emit an ultrasound haptic and the contact sensor 124 may be configured to detect a sensor value.

The processor 130 may be configured to obtain a real position of the hand-mounted device 120 to determine a virtual position of a virtual hand in the virtual world. Further, the processor 130 may be configured to determine a virtual distance between the virtual hand and a virtual object in the virtual world based on the virtual position. Furthermore, the processor 130 may be configured to determine a hand of the user is open or not based on the sensor value. Moreover, the processor 130 may be configured to, in response to the virtual distance being smaller than a contact distance and the hand being open, enable the ultrasound transducer 122 to emit the ultrasound haptic to the finger of the user.

In this manner, since the ultrasound transducer 122 is embedded in the hand-mounted device 120, the hand of the user may be free to move to anywhere and still be able to receive the ultrasound haptic feedback.

In one embodiment, the display device 110 may be a head-mounted display (HMD), wearable glasses (e.g., AR/VR goggles), a tablet, a smartphone, a projector, a laptop, other similar devices adapted for Extended Reality (XR) or other reality related technologies, or a combination of these devices. However, this disclosure is not limited thereto.

In one embodiment, the display device 110 may include a display module (not shown) and the display module includes, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto.

In one embodiment, the display device 110 or the hand-free haptic feedback system 100 may include a camera (not shown). That is, the camera may be embedded in the display device 110 or in an extra device in the hand-free haptic feedback system 100. The camera, for example, a complementary metal oxide semiconductor (CMOS) camera or a charge coupled device (CCD) camera. However, this disclosure is not limited thereto. For example, the camera may be replaced with a light detection and ranging (LiDAR) device, a global positioning system (GPS) device, a radar, infrared sensor, an ultrasonic sensor, other similar devices, or a combination of these devices.

In one embodiment, the camera may be configured to obtain a hand image of the user. Further, the processor 130 may be configured to obtain the real position of the hand-mounted device 120 based on the hand image. Furthermore, the processor 130 may be configured to determine the virtual position of the virtual hand in the virtual world based on the real position (e.g., based on a simultaneous localization and mapping (SLAM) algorithm). That is, a position of a real hand of the user in a real world may be detected by the camera for determining a position of a virtual hand of the user in a virtual world. However, this disclosure is not limited thereto.

In one embodiment, the hand-mounted device 120 may include an inertial measurement unit (IMU) sensor (not shown). The IMU sensor may be configured to detect an IMU value of the hand-mounted device 120. Further, the processor 130 may be configured to obtain the real position of the hand-mounted 120 based on the IMU value. Furthermore, the processor 130 may be configured to determine the virtual position of the virtual hand in the virtual world based on the real position. That is, a position of a real hand of the user in a real world may be detected by the IMU sensor for determining a position of a virtual hand of the user in a virtual world. However, this disclosure is not limited thereto.

In one embodiment, the IMU sensor includes, for example, a gyroscope, an accelerometer, other similar devices, or a combination of these devices. This disclosure is not limited thereto. In one embodiment, the IMU sensor may be an accelerometer and may be configured to detect at least one of three linear acceleration values in three degrees of freedom. The three linear acceleration values may include a first acceleration value along an X axis, a second acceleration value along a Y axis, and a third acceleration value along a Z axis. In one embodiment, the IMU sensor may be a gyroscope and may be configured to detect at least one of three angular velocities in three degrees of freedom (DOF). The three angular velocities may include a roll angular velocity about an X axis, a pitch angular velocity about a Y axis, and a yam angular velocity about a Z axis. In one embodiment, the IMU sensor may include an accelerometer and a gyroscope and configured to detect changes in six degrees of freedom. The changes in the six degrees of freedom includes the three linear acceleration values corresponding to the three perpendicular axes and the three angular velocities corresponding to three perpendicular axes (e.g., X, Y, Z axes). That is, the IMU value includes, for example, at least one of the three linear acceleration value and the three angular velocities. However, this disclosure is not limited thereto.

In one embodiment, the contact sensor 124 may include a capacitance sensor. The capacitance sensor may be configured to detect a capacitance value as the sensor value. Further, the processor 130 may be configured to determine whether the finger being open based on the capacitance value. That is, a hand of the user is open (i.e., the finger of the user does not contact with the palm or the contact sensor 124) may be detected by the capacitance sensor.

In one embodiment, the contact sensor 124 may include a pressure sensor. The pressure sensor may be configured to detect a pressure value as the sensor value. Further, the processor 130 may be configured to determine whether the finger being open based on the pressure value. That is, a hand of the user is open (i.e., the finger of the user does not contact with the palm or the contact sensor 124) may be detected by the pressure sensor.

In one embodiment, the contact sensor 124 may include a camera. The camera may be configured to obtain a finger image of the finger of the user as the sensor value. Further, the processor 130 may be configured to determine whether the finger being open based on the finger image (e.g., based on SLAM algorithm). That is, a hand of the user is open (i.e., the finger of the user does not contact with the palm or the contact sensor 124) may be detected by the camera.

In one embodiment, the display device 110 or the hand-mounted device 120 may include a network module (not shown) and the network module includes, for example, a wired network module, a wireless network module, a Bluetooth module, an infrared module, a radio frequency identification (RFID) module, a Zigbee network module, or a near field communication (NFC) network module, but the disclosure is not limited thereto. That is, the display device 110 may be configured to communicate with the hand-mounted device 120 through either wired communication or wireless communication.

In one embodiment, the processor 130 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 130 may be achieved as multiple program codes. The program codes are stored in a memory, and executed by the processor 130. Alternatively, in an embodiment, each of the functions of the processor 130 may be achieved as one or more circuits. The disclosure does not limit the use of software or hardware to achieve the functions of the processor 130.

Further, the processor 130 may be integrated in the display device 110, in the hand-mounted device 120, in an extra device, or in a cloud server. However, this disclosure is not limited thereto. That is, this disclosure does not limit where the computation is performed in the wearable tracking system 100.

Figure 2A:
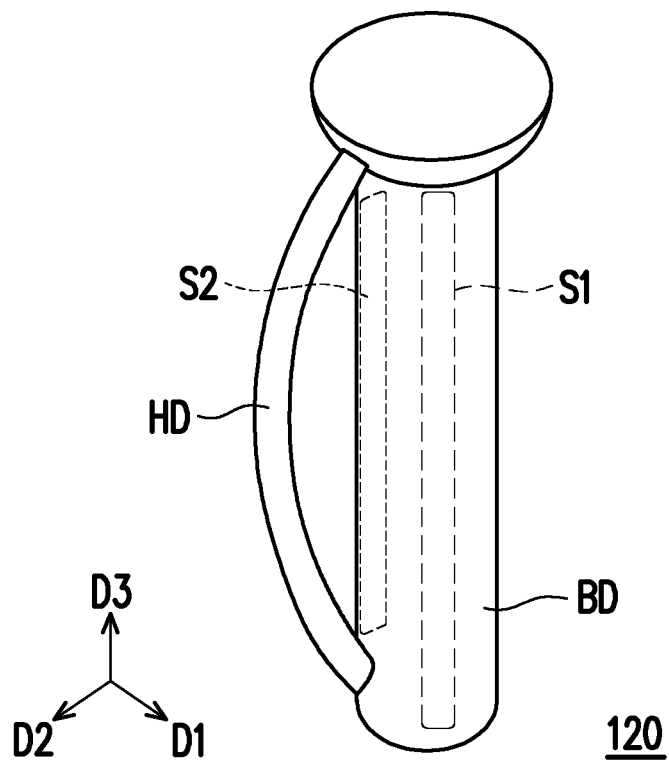
FIG. 2A is a schematic diagram of a hand-mounted device of the hand-free haptic feedback system according to an embodiment of the disclosure.
Figure 2B:
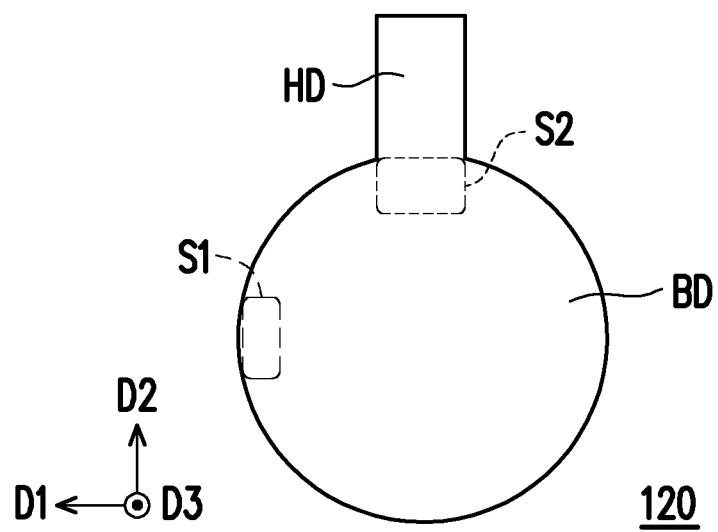
FIG. 2B is a schematic top view of a hand-mounted device of the hand-free haptic feedback system according to an embodiment of the disclosure.

FIG. 2A is a schematic diagram of a hand-mounted device of the hand-free haptic feedback system according to an embodiment of the disclosure. FIG. 2B is a schematic top view of a hand-mounted device of the hand-free haptic feedback system according to an embodiment of the disclosure. With reference to FIG. 1 to FIG. 2B, FIG. 2A depicts an exemplary structure of the hand-mounted device 120 and FIG. 2B depicts a top view of the hand-mounted device 120.

Referring to FIG. 2A and FIG. 2B, a coordinate system may include a first direction D1, a second direction D2, and a third direction D3 and the first direction D1, the second direction D2 and the third direction D3 may be perpendicular to each other.

In one embodiment, the hand-mounted device 120 may include a device body BD and a holding component HD. The device body BD may include a first side S1 and a second side S2 different from the first side S1. In one embodiment the first side S1 may be disposed in the first direction D1 of the device body BD and the second side S2 may be disposed in the second direction D2 of the device body BD. That is, the second side S2 may be perpendicular to the first side S1, but this disclosure does not limited thereto. In another embodiment, the second side S2 may be adjacent to the first side S1. In yet another embodiment, the second side S2 may be opposite to the first side S1. That is, the first side S1 and the second side S2 may be disposed anywhere on the surface of the device body BD. In other words, the first side S1 may be disposed while it is depicted for the sake of convenience in explanation that the second side S2 is perpendicular to the first side S1, it is to be noted that the positions of the first side S1 and the second side S2 are not limited thereto and may be adjusted according to design needs.

In one embodiment, the ultrasound transducer 122 and/or the contact sensor 124 may be both disposed on the first side S1. In another embodiment, the ultrasound transducer 122 may be disposed on the first side S1 and the contact sensor 124 may be disposed on a contact surface of the surface of the device body BD. The contact surface may be a surface where the finger of the user may contact the device body BD. For example, the contact surface may be one position on an opposite side from the first side S1 to the second side S2. In addition, the holding component HD may be coupled to the device body BD. The holding component HD may be disposed on the second side S2 of the device body BD and adapted to be wrapped around a palm of the user for holding the hand-mounted device 120 on the hand of the user. For example, the holding component HD may be a strap, a band, a belt, other similar structures adapted for holding the hand-mounted device 120 on the hand of the user, or a combination of these devices. However, this disclosure is not limited thereto.

Figure 2C:
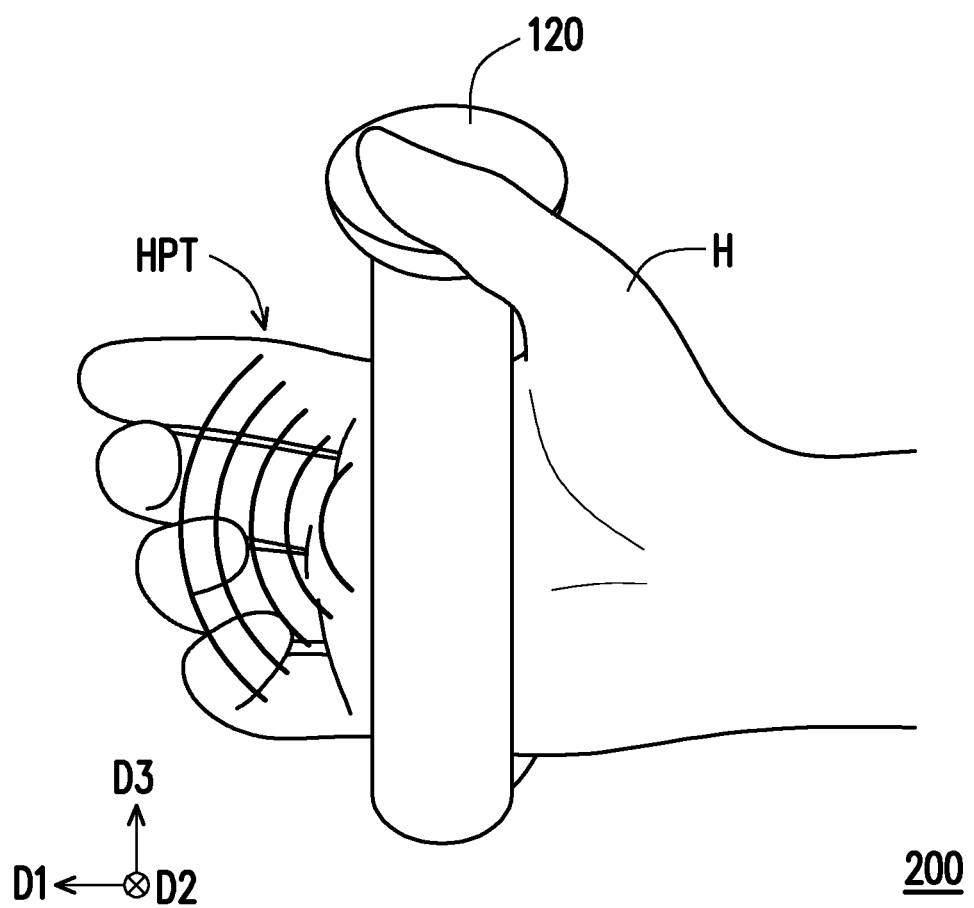
FIG. 2C is a schematic diagram of a scenario of a haptic feedback of the hand-free haptic feedback system according to an embodiment of the disclosure.

FIG. 2C is a schematic diagram of a scenario of a haptic feedback of the hand-free haptic feedback system according to an embodiment of the disclosure. With reference to FIG. 1 to FIG. 2C, FIG. 2C depicts a haptic feedback scenario 200 that the hand-mounted device 120 is worn on a hand H of a user.

In one embodiment, the user may put the hand H between the holding component HD and the device body BD, thereby fixing the hand-mounted device 120 on the hand H. The ultrasound transducer 122 and the contact sensor 124 may be disposed on the first side S1 in the first direction D1 of the device body BD, so as to detect a status of a finger of the user by the contact sensor 124 and emit an ultrasound haptic HPT by the ultrasound transducer 122.

It is noted that, since the hand-mounted device 120 is fixing on the hand H of the user by the holding component HD, the hand H of user is still free to move to anywhere and still be able to receive the ultrasound haptic feedback (HPT) from the ultrasound transducer 122.

Further, since the status of the finger of the user may be detected by the contact sensor 124, a status of the hand H being open or not may be detected. In the virtual world display by the display device 110, while the user intends to touch a virtual object, the user may open the hand H to perform the act of touching. Therefore, by detecting the hand H being open or not, the ultrasound transducer 122 may be configured to emit the ultrasound haptic HPT only when the hand H is open. Hence, the ultrasound haptic HPT may be provided correctly, thereby increasing the user experience.

Furthermore, while the hand H of the user is not open, the ultrasound transducer 122 may be disabled. That is, the ultrasound transducer 122 may be only enabled while the hand H of the user is open (which means the user intends to touch a virtual object), thereby decreasing the energy consumption. In other words, the processor 130 may be configured to, in response to the hand H being open, enable the ultrasound transducer 122 to emit the ultrasound haptic HPT to the finger of the user. In addition, the processor 130 may be configured to, in response to the hand H not being open, disable the ultrasound transducer 122 to not emit the ultrasound haptic HPT to the finger of the user.

Moreover, in one embodiment, the ultrasound sensor 122, may be disposed facing a fingertip of the finger of the user and may be configured to emit the ultrasound haptic HPT towards the fingertip. Since the fingertip of the user may be usually most sensitive to the sense of touch, the user may be able to feel the ultrasound haptic HPT clear through the fingertip, thereby increasing the user experience.

In this manner, haptic feedback HPT may be provided to the user conveniently in the applications of AR, VR, or MR with the hand-free haptic feedback system 100, thereby increasing the immersion experience of the user.

Figure 3A:
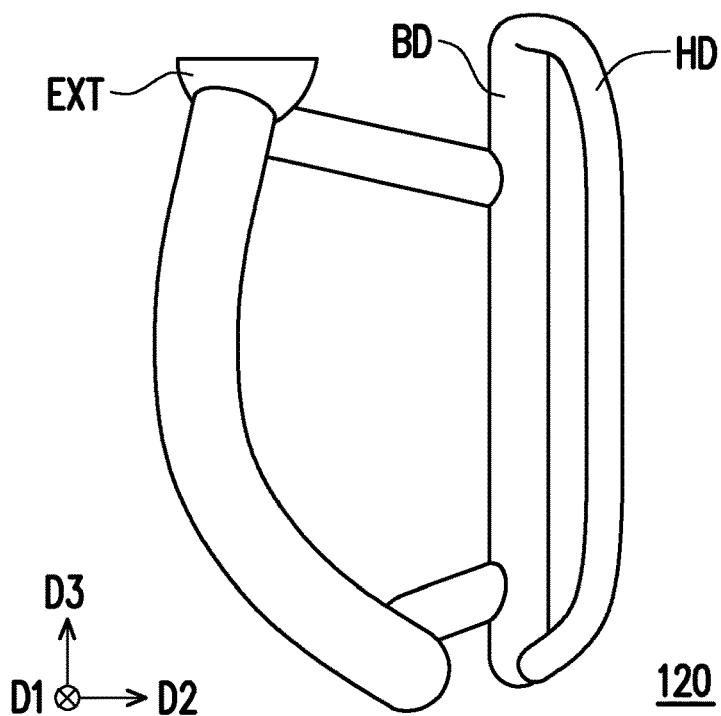
FIG. 3A is a schematic side view of a hand-mounted device of the hand-free haptic feedback system according to an embodiment of the disclosure.
Figure 3B:
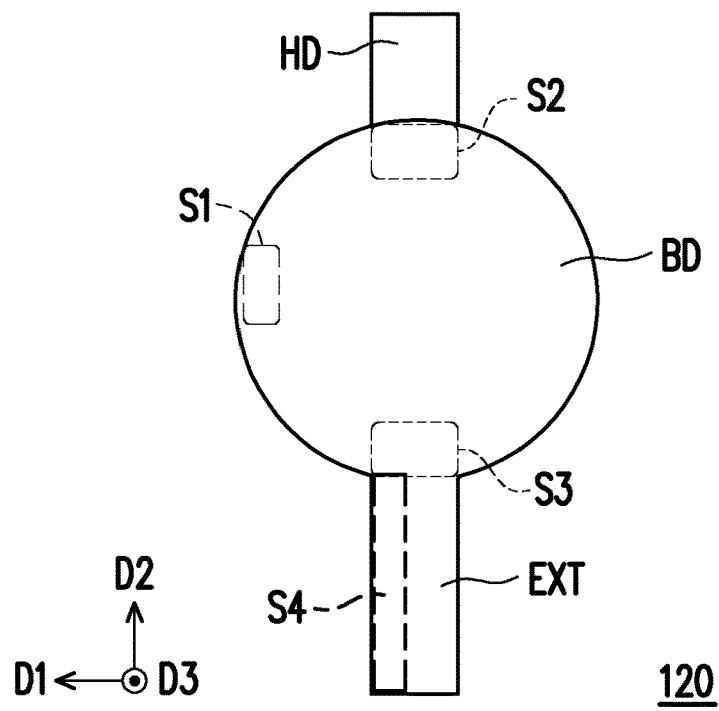
FIG. 3B is a schematic top view of a hand-mounted device of the hand-free haptic feedback system according to an embodiment of the disclosure.

FIG. 3A is a schematic side view of a hand-mounted device of the hand-free haptic feedback system according to an embodiment of the disclosure. FIG. 3B is a schematic top view of a hand-mounted device of the hand-free haptic feedback system according to an embodiment of the disclosure. With reference to FIG. 1, FIG. 3A, and FIG. 3B, FIG. 3A depicts a side view of an exemplary structure of the hand-mounted device 120 and FIG. 3B depicts a top view of the hand-mounted device 120.

Referring to FIG. 3A and FIG. 3B, a coordinate system may include a first direction D1, a second direction D2, and a third direction D3, and the first direction D1, the second direction D2 and the third direction D3 may be perpendicular to each other.

In one embodiment, the hand-mounted device 120 may include a device body BD, a holding component HD, and an extending component EXT. The device body BD may include a first side S1, a second side S2, and a third side S3. As shown in FIG. 3B, the third side S3 may be opposite to the second side S2. While it is depicted for the sake of convenience in explanation that the first side S1 is perpendicular to the second side S2 and the third side S3, it is to be noted that the positions of the first side S1, the second side S2, and the third side S3 are not limited thereto and may be adjusted according to design needs.

In addition, the holding component HD may be coupled to the device body BD. The holding component HD may be disposed on the second side S2 of the device body BD and adapted to be wrapped around a palm of the user for holding the hand-mounted device 120 on the hand H of the user. For example, the holding component HD may be a strap, a band, a belt, other similar structures adapted for holding the hand-mounted device 120 on the hand of the user, or a combination of these devices. However, this disclosure is not limited thereto.

Moreover, the extending component EXT may be coupled to the device body BD and extending from the third side S3 of the device body BD. The extending component EXT may include a fourth side S4 parallel to the second side S2. In other words, the fourth side S4 may be perpendicular to the third side S3. In one embodiment, the ultrasound transducer 122 may be disposed on the fourth side S4, but this disclosure is not limited thereto.

In one embodiment, the contact sensor 124 may be disposed on the first side S1 of the device body BD, which may be as the arrangement of the hand-mounted device 120 of FIG. 2A to FIG. 2C. In another embodiment, the contact sensor 124 may be disposed on the fourth side S4 of the extending component EXT. It is noted that, comparing with the first side S1, while the finger of the user touches the fourth side S4, the angle of the finger of the user bends may be smaller. That is, the user may be no need to close the hand firmly to touch the contact sensor 124. In other words, the finger of the user may stay in a relaxed status while touching the contact sensor 124, thereby increasing the freedom of the finger of the user and also the user experience.

Figure 3C:
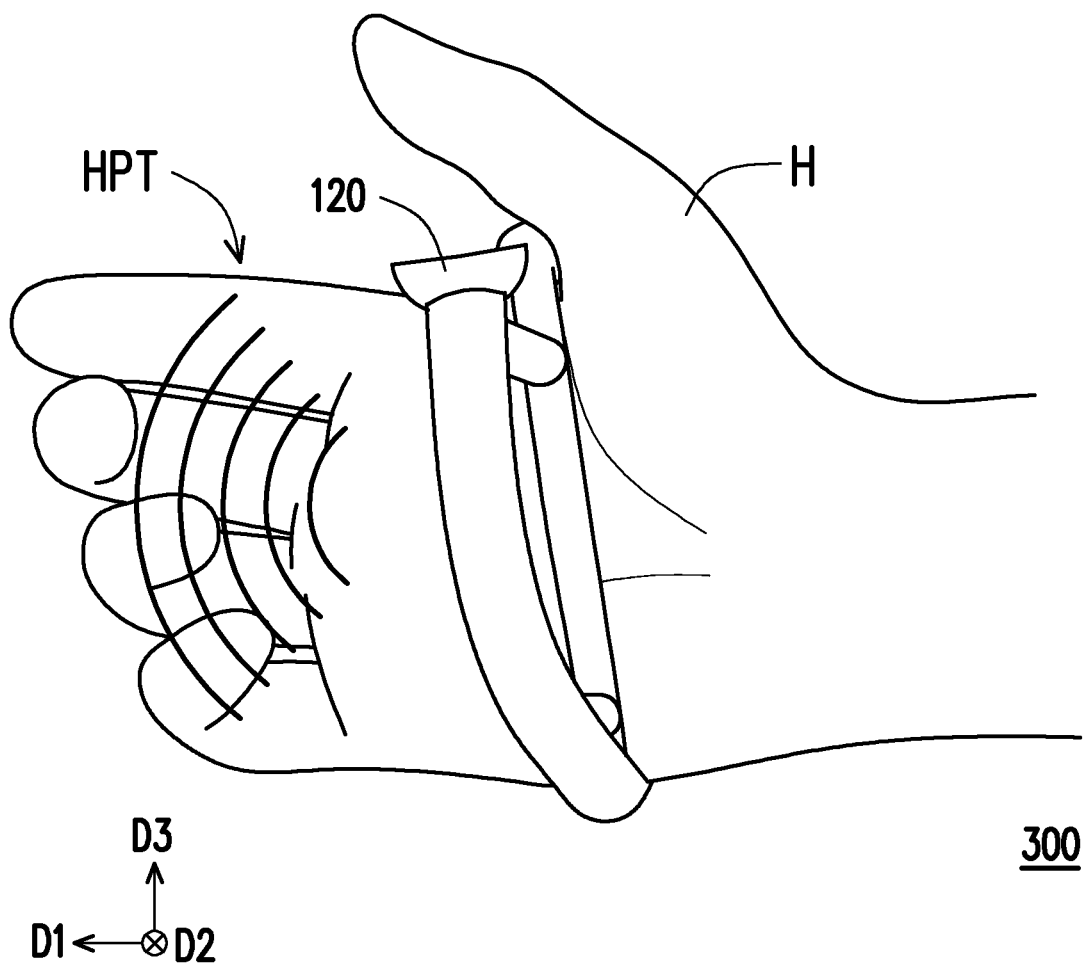
FIG. 3C is a schematic diagram of a scenario of a haptic feedback of the hand-free haptic feedback system according to an embodiment of the disclosure.

FIG. 3C is a schematic diagram of a scenario of a haptic feedback of the hand-free haptic feedback system according to an embodiment of the disclosure. With reference to FIG. 1, FIG. 3A, FIG. 3B, and FIG. 3C, FIG. 3C depicts a haptic feedback scenario 300 that the hand-mounted device 120 is worn on a hand H of a user.

In one embodiment, the user may put the hand H between the holding component HD and the device body BD, thereby fixing the hand-mounted device 120 on the hand H. The ultrasound transducer 122 and/or the contact sensor 124 may be disposed on the first side S1 in the first direction D1 of the device body BD or the fourth side S4 of the extending body EXT, so as to detect a status of a finger of the user by the contact sensor 124 and emit an ultrasound haptic HPT by the ultrasound transducer 122.

In this manner, haptic feedback HPT may be provided to the user conveniently in the applications of AR, VR, or MR with the hand-free haptic feedback system 100, thereby increasing the immersion experience of the user.

Figure 4A:
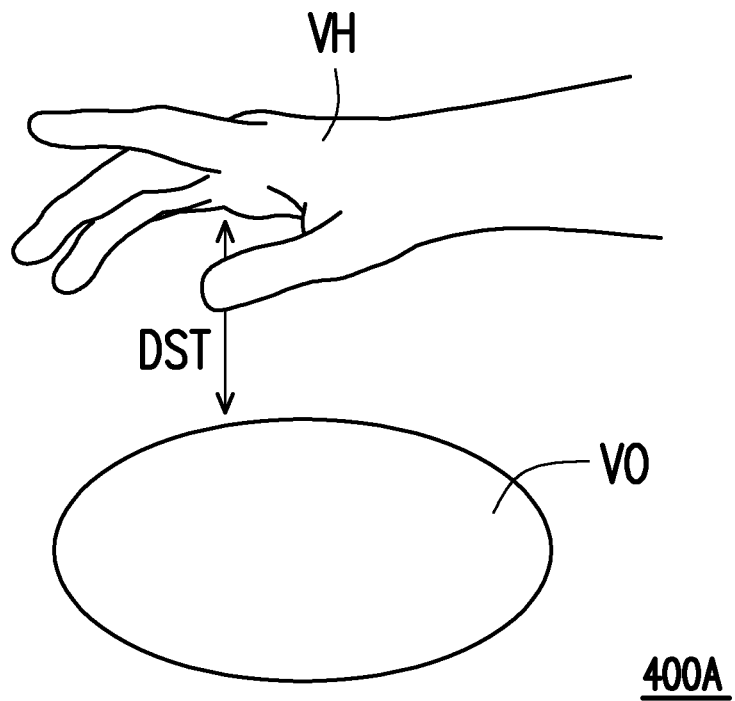
FIG. 4A is a schematic diagram of a scenario of a virtual hand in a virtual world according to an embodiment of the disclosure.
Figure 4B:
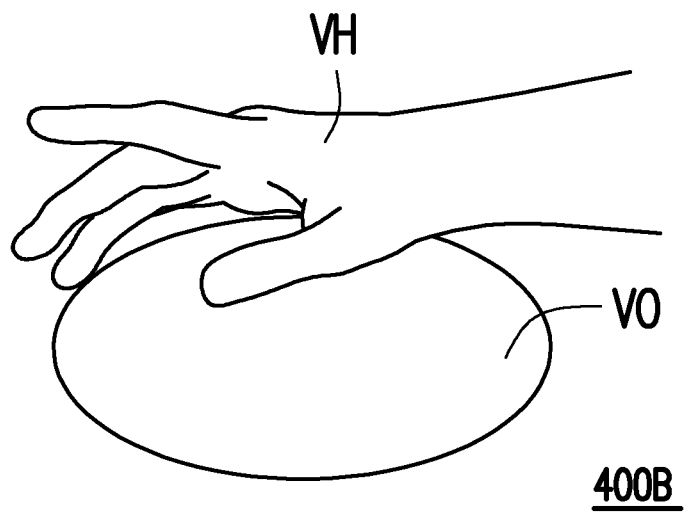
FIG. 4B is a schematic diagram of a scenario of a virtual hand in a virtual world according to an embodiment of the disclosure.

FIG. 4A is a schematic diagram of a scenario of a virtual hand in a virtual world according to an embodiment of the disclosure. FIG. 4B is a schematic diagram of a scenario of a virtual hand in a virtual world according to an embodiment of the disclosure. With reference to FIG. 1, a scenario 400A in FIG. 4A and a scenario 400B in FIG. 4B, FIG. 4A and FIG. 4B depict an interaction between a virtual hand VH and a virtual object VO in a virtual world display by the display device 110.

Referring to FIG. 4A, in a virtual world displayed by the display device 110, a virtual hand VH may be shown and the user may control the virtual hand VH by a real hand of the user in a real world. For example, a real position of a hand H of the user in the real world may be determined based on a hand image of the hand H or an inertial measurement unit value of an inertial measurement unit of a hand-mounted device 120 worn on the hand H of the user. However, this disclosure does not limit thereto.

In one embodiment, a virtual position of the virtual hand VH in the virtual world may correspond to the real position of the hand H in the real world. For example, while the hand H in the real world moves upward, the virtual hand VH in the virtual world may also move upward. The processor 130 may be configured to determine a virtual distance DST between the virtual hand VH and the virtual object VO. Further, as shown in FIG. 4B, in response to the virtual distance DST being smaller than a contact distance, the processor 130 may be configured to determine that the virtual hand VH contacts with the virtual object VO. On the other hand, in response to the virtual distance DST being not smaller than the contact distance, the processor 130 may be configured to determine that the virtual hand VH does not contact with the virtual object VO.

Figure 4C:
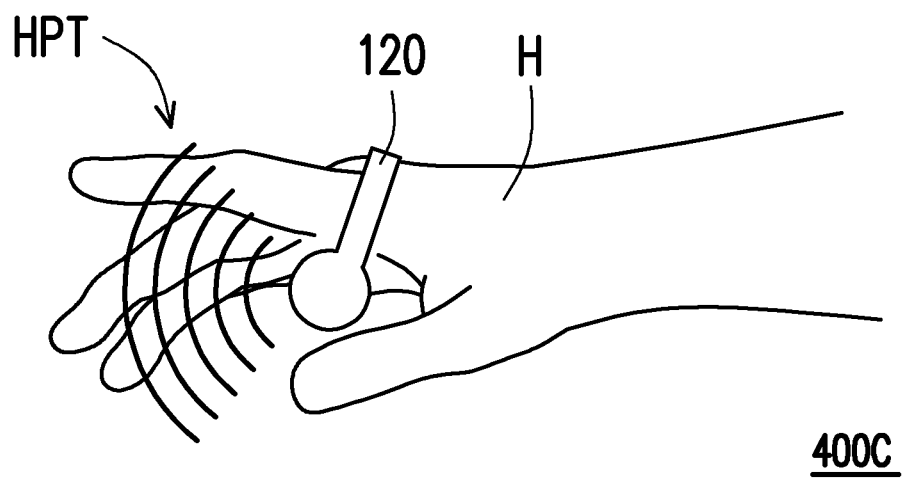
FIG. 4C is a schematic diagram of a scenario of a haptic feedback of the hand-free haptic feedback system according to an embodiment of the disclosure.

FIG. 4C is a schematic diagram of a scenario of a haptic feedback of the hand-free haptic feedback system according to an embodiment of the disclosure. With reference to FIG. 1, FIG. 4A, FIG. 4B, and FIG. 4C, FIG. 4C depicts a haptic feedback scenario 400C that the hand-mounted device 120 is worn on a hand H of a user.

Referring to FIG. 4C, in response to the virtual hand VH contacts with the virtual object VO being determined, the ultrasound transducer 122 of the hand-held device 120 may be configured to emit the ultrasound haptic HPT towards a finger of the user. That is, while the user uses the virtual hand VH to touch the virtual object VO, the ultrasound haptic HPT may be provided to the finger of the hand H in the real world. Therefore, the user may actually feel like touch an object.

In this manner, haptic feedback HPT may be provided to the user conveniently in the applications of AR, VR, or MR with the hand-free haptic feedback system 100, thereby increasing the immersion experience of the user.

Figure 5:
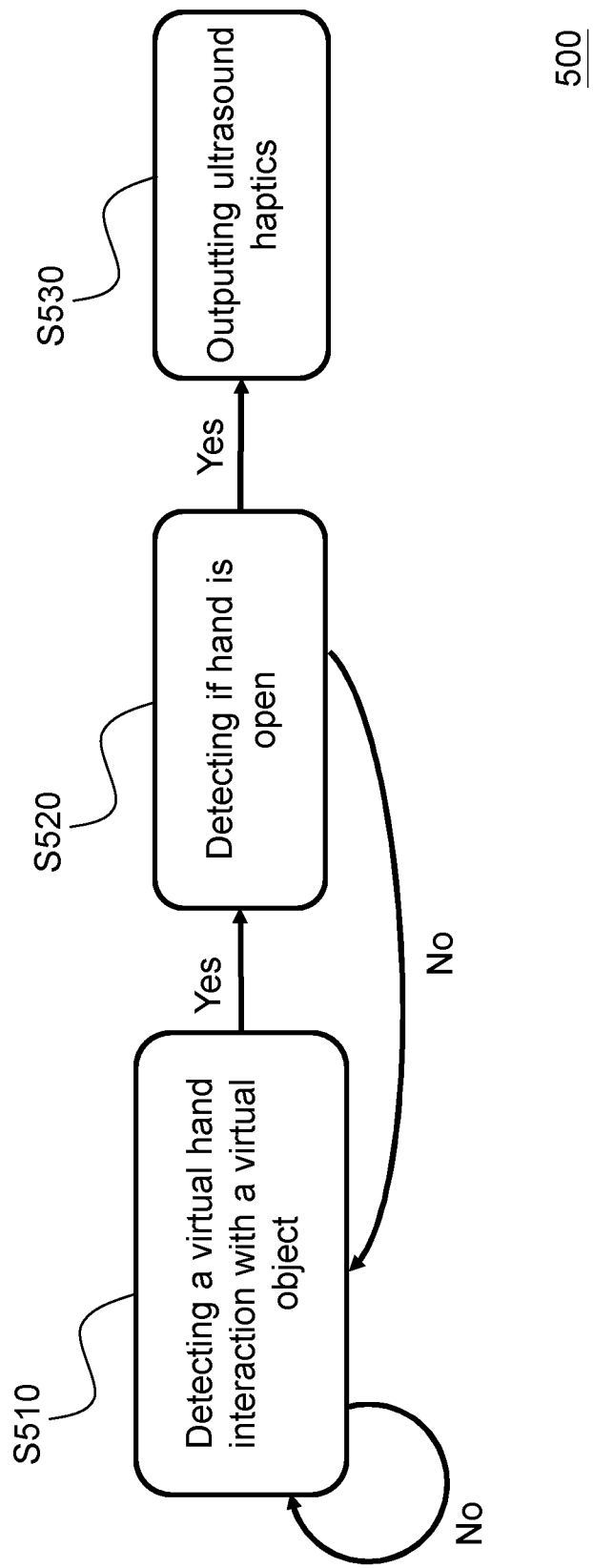
FIG. 5 is a schematic flowchart of a hand-free haptic feedback method according to an embodiment of the disclosure.

FIG. 5 is a schematic flowchart of a hand-free haptic feedback method according to an embodiment of the disclosure. With reference to FIG. 1 to FIG. 5, a hand-free haptic feedback method 500 may include a step S510, a step S520, and a step S530.

In the step S510, a virtual hand interaction with a virtual object VO may be detected. For example, the virtual hand interaction may be detected based on the virtual distance DST between the virtual hand VH and the virtual objection VO, but this disclosure does not limit thereto. Further, while the virtual hand interaction is detected, the step S520 may be performed. Otherwise, while the virtual hand interaction is detected, the step S510 may be performed repeatedly.

In the step S520, a status of the hand H in the real world being open or not may be detected. For example, while the finger being not in contact with the contact sensor 124 is detected by the contact sensor 124, the status of the hand H in the real world may be determined as being open. On the other hand, while the finger being in contact with the contact sensor 124 is detected by the contact sensor 124, the status of the hand H in the real world may be determined as being closed. However, this disclosure is not limited thereto. Further, while the hand H being open is detected, the step S530 may be performed. Otherwise, while the hand H being not open is detected, the step S510 may be performed.

In the step S530, the ultrasound haptic HPT may be outputted by the ultrasound transducer 122.

In this manner, haptic feedback HPT may be provided to the user conveniently in the applications of AR, VR, or MR with the hand-free haptic feedback method 500, thereby increasing the immersion experience of the user.

Figure 6:
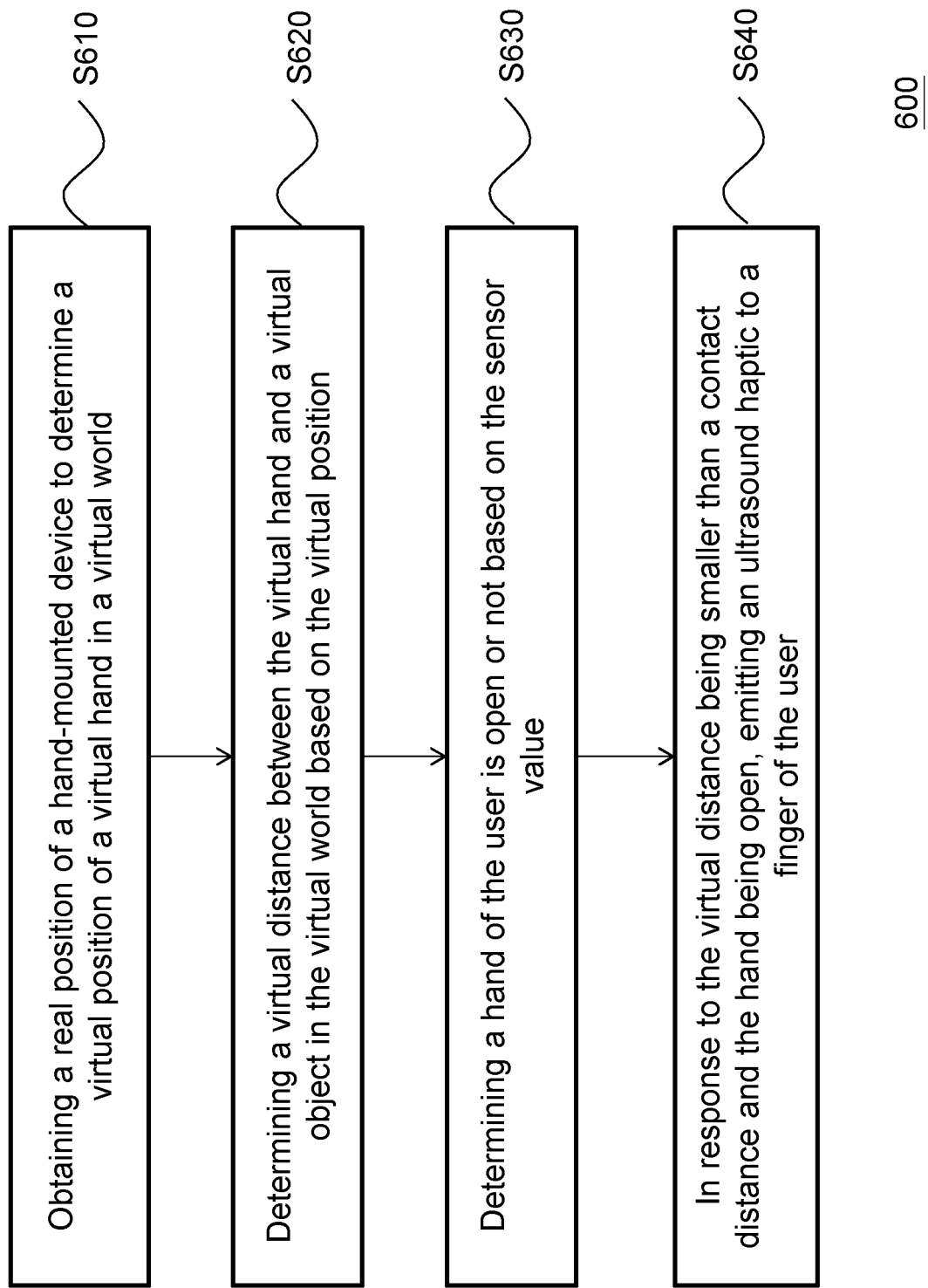
FIG. 6 is a schematic flowchart of a hand-free haptic feedback method according to an embodiment of the disclosure.

FIG. 6 is a schematic flowchart of a hand-free haptic feedback method according to an embodiment of the disclosure. With reference to FIG. 1 to FIG. 6, a hand-free haptic feedback method 600 may include a step S610, a step S620, a step S630, and a step S640.

In the step S610, a real position of the hand-mounted device 120 may be obtained to determine a virtual position of a virtual hand VH in a virtual world displayed by the display device 110. The hand-mounted device 120 may be adapted to be worn on the hand H of a user.

In the step S620, the virtual distance DST between the virtual hand VH and the virtual object VO in the virtual world may be determined based on the virtual position.

In the step S630, the hand H of the user is open or not may be determined based on a sensor value detected by the contact sensor 124 of the hand-mounted device 120.

In the step S640, in response to the virtual distance DST being smaller than a contact distance and the hand H being open, the ultrasound transducer 122 of the hand-mounted device 120 may be enabled to emit the ultrasound haptic HPT to the finger of the user.

It is noted that, the implementation details of the hand-free haptic feedback method 600 may be referred to the descriptions of FIG. 1 to FIG. 5 to obtain sufficient teachings, suggestions, and implementation embodiments, while the details are not redundantly described seriatim herein.

In this manner, haptic feedback HPT may be provided to the user conveniently in the applications of AR, VR, or MR with the hand-free haptic feedback method 600, thereby increasing the immersion experience of the user.

In summary, according to the hand-free haptic feedback system 100 and the hand-free haptic feedback method 600, since the ultrasound transducer 122 is embedded in the hand-mounted device 120, the hand H of the user may be free to move to anywhere and still be able to receive the ultrasound haptic feedback HPT.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A hand-free haptic feedback system, comprising:
a display device, configured to display a virtual world;
a hand-mounted device, adapted to be worn on a hand of a user, wherein the hand-mounted device comprises:

an ultrasound transducer, configured to emit an ultrasound haptic; and a contact sensor, configured to detect a sensor value; and a processor, configured to:

obtain a real position of the hand-mounted device to determine a virtual position of a virtual hand in the virtual world;

determine a virtual distance between the virtual hand and a virtual object in the virtual world based on the virtual position;

determine the hand of the user is open or not based on the sensor value;

in response to the virtual distance being smaller than a contact distance and the hand being open, enable the ultrasound transducer to emit the ultrasound haptic to a finger of the user;

in response to the hand being open, enable the ultrasound transducer to emit the ultrasound haptic to the finger of the user; and in response to the hand not being open, disable the ultrasound transducer to not emit the ultrasound haptic to the finger of the user.

2. The hand-free haptic feedback system according to claim 1, wherein the hand-mounted device comprises:

a device body, comprising a first side and a second side different from the first side; and a holding component, coupled to the device body, wherein the holding component is disposed on the second side of the device body and adapted to be wrapped around a palm of the user for holding the hand-mounted device on the hand of the user.

3. The hand-free haptic feedback system according to claim 2, wherein the ultrasound transducer and/or the contact sensor are disposed on the first side.

4. The hand-free haptic feedback system according to claim 1, wherein the hand-mounted device comprises:

a device body, comprising a first side, a second side, and a third side, wherein the third side is opposite to the second side;

a holding component, coupled to the device body, wherein the holding component is disposed on the second side of the device body and adapted to be wrapped around a palm of the user for holding the hand-mounted device on the hand of the user; and an extending component, coupled to the device body and extending from the third side of the device body, wherein the extending component comprises a fourth side parallel to the second side and the ultrasound transducer is disposed on the first side or the fourth side.

5. The hand-free haptic feedback system according to claim 4, wherein the contact sensor is disposed on the first side of the device body.

6. The hand-free haptic feedback system according to claim 4, wherein the contact sensor is disposed on the fourth side of the extending component.

7. The hand-free haptic feedback system according to claim 1, wherein the hand-mounted device comprises:

an inertial measurement unit sensor, configured to detect an inertial measurement unit value, wherein the processor is configured to:

obtain the real position of the hand-mounted device based on the inertial measurement unit value; and determine the virtual position of the virtual hand in the virtual world based on the real position.

8. The hand-free haptic feedback system according to claim 1, further comprising:

a camera, configured to obtain a hand image of the hand of the user, wherein the processor is configured to:

obtain the real position of the hand-mounted device based on the hand image; and determine the virtual position of the virtual hand in the virtual world based on the real position.

9. The hand-free haptic feedback system according to claim 1, wherein the contact sensor comprises:

a capacitance sensor, configured to detect a capacitance value as the sensor value, wherein the processor is configured to:

determine whether the hand being open based on the capacitance value.

10. The hand-free haptic feedback system according to claim 1, wherein the contact sensor comprises:

a pressure sensor, configured to detect a pressure value as the sensor value, wherein the processor is configured to:

determine whether the hand being open based on the pressure value.

11. The hand-free haptic feedback system according to claim 1, wherein the contact sensor comprises:

a camera, configured to obtain a finger image of the finger of the user as the sensor value, wherein the processor is configured to:

determine whether the hand being open based on the finger image.

12. The hand-free haptic feedback system according to claim 1, wherein the ultrasound transducer is disposed facing a fingertip of the finger and is configured to emit the ultrasound haptic towards the fingertip.

13. A hand-free haptic feedback method, comprising:

obtaining a real position of a hand-mounted device to determine a virtual position of a virtual hand in a virtual world, wherein the hand-mounted device is adapted to be worn on a hand of a user;

determining a virtual distance between the virtual hand and a virtual object in the virtual world based on the virtual position;

determining the hand of the user is open or not based on a sensor value detected by a contact sensor of the hand-mounted device;

in response to the virtual distance being smaller than a contact distance and the hand being open, enabling an ultrasound transducer of the hand-mounted device to emit an ultrasound haptic to a finger of the user;

in response to the hand being open, enable the ultrasound transducer to emit the ultrasound haptic to the finger of the user; and in response to the hand not being open, disable the ultrasound transducer to not emit the ultrasound haptic to the finger of the user.

14. The hand-free haptic feedback method according to claim 13, wherein the hand-mounted device comprises:

a device body, comprising a first side and a second side different from the first side; and a holding component, coupled to the device body, wherein the holding component is disposed on the second side of the device body and adapted to be wrapped around a palm of the user for holding the hand-mounted device on the hand of the user.

15. The hand-free haptic feedback method according to claim 14, wherein the ultrasound transducer and/or the contact sensor are disposed on the first side.

16. The hand-free haptic feedback method according to claim 14, wherein the hand-mounted device comprises:
- a device body, comprising a first side, a second side, and a third side, wherein the third side is opposite to the second side;
- a holding component, coupled to the device body, wherein the holding component is disposed on the second side of the device body and adapted to be wrapped around a palm of the user for holding the hand-mounted device on the hand of the user; and
- an extending component, coupled to the device body and extending from the third side of the device body, wherein the extending component comprises a fourth side parallel to the second side and the ultrasound transducer is disposed on the first side or the fourth side.

17. The hand-free haptic feedback method according to claim 16, wherein the contact sensor is disposed on the first side of the device body or the fourth side of the extending component.

18. The hand-free haptic feedback method according to claim 13, further comprising:
- in response to the hand being open, enabling the ultrasound transducer to emit the ultrasound haptic to the finger of the user; and
- in response to the hand not being open, disabling the ultrasound transducer to not emit the ultrasound haptic to the finger of the user.

19. The hand-free haptic feedback method according to claim 13, further comprising:
- disposing the ultrasound transducer facing a fingertip of the finger; and
- emitting the ultrasound haptic towards the fingertip.

* * * * *